R. E. FERRIS.
CONTROL SYSTEM.
APPLICATION FILED OCT. 14, 1916.

1,317,284.

Patented Sept. 30, 1919.

WITNESSES:
Fred H. Miller
W. B. Wells

INVENTOR
Ralph E. Ferris
BY
Wesley G. Carr
ATTORNEY

THE COLUMBIA PLANOGRAPH CO., WASHINGTON, D. C.

UNITED STATES PATENT OFFICE.

RALPH E. FERRIS, OF SWISSVALE, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,317,284.  Specification of Letters Patent.  Patented Sept. 30, 1919.

Application filed October 14, 1916. Serial No. 125,590.

*To all whom it may concern:*

Be it known that I, RALPH E. FERRIS, a citizen of the United States, and a resident of Swissvale, in the county of Allegheny and State of Pennsylvania, have invented a new and useful Improvement in Control Systems, of which the following is a specification.

My invention relates to systems of control for electric vehicles and particularly to regenerative systems of control which are adapted to return energy to the supply circuits when the vehicles are coasting or are being retarded.

One object of my invention is to provide a system of the above indicated character that is provided with means for preventing excessive excitation of the field windings of the motors contained therein, in case the motors be disconnected from the supply circuit when regenerating energy.

More specifically, my invention is a regenerative system of control comprising motors the field windings of which are energized by means of a motor-generator set. Separate connections are provided between the motor armature of the motor-generator set and between the armatures of the motors and the supply circuit, whereby the motors may not build up an excessive voltage in the local circuit including the motor armature of the motor-generator set and the armatures of the propelling motors.

Figure 1:
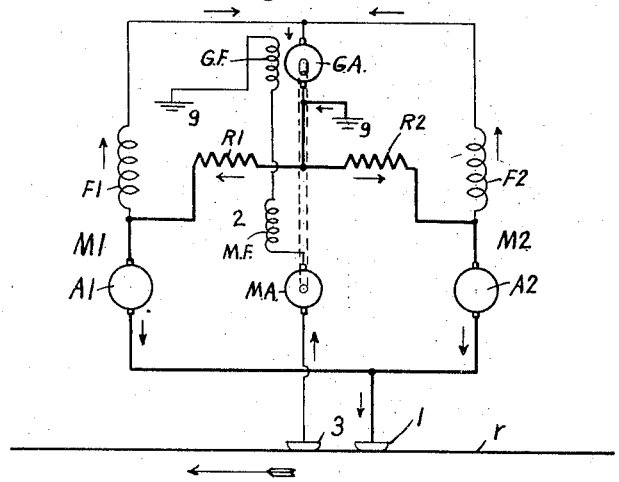
Figure 2:
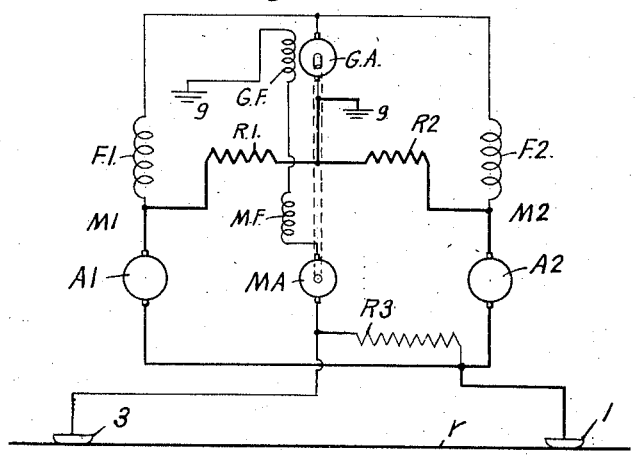

In the accompanying drawings, Figure 1 is a diagrammatic view of a system of control embodying my invention; and Fig. 2 is a diagrammatic view of a modification of the system disclosed in Fig. 1.

The systems shown in Figs. 1 and 2 disclose only the circuit connections during regeneration, as my invention is primarily adapted to prevent regeneration of injurious currents when the propelling motors of the vehicle are being operated as generators. Reference may be had to the application of R. E. Hellmund, Serial No. 44,443, filed August 9, 1915, and assigned to the Westinghouse Electric and Manufacturing Company for a detailed disclosure of the systems illustrated in Figs. 1 and 2 in combination with my invention.

Referring to Fig. 1 of the drawings, motors M1 and M2, respectively comprising armatures A1 and A2 and field windings F1 and F2, are shown in position for supplying energy to a supply circuit comprising a rail conductor $r$ and a ground conductor $g$. The armatures A1 and A2 are connected in series with two resistors R1 and R2 across the supply conductors $r$ and $g$, by means of a current collector 1. A motor-generator set 2 comprising a motor armature MA, a motor field MF, a generator armature GA and a generator field GF, is adapted to be connected across the supply conductors $r$ and $g$ and supply energy for the excitation of the field windings F1 and F2. The generator armature GA is connected in circuit with the field windings F1 and F2, and the motor armature MA, the motor field MF, and the generator field GF are connected across the supply conductors $r$ and $g$, by means of a current collector 3.

As the system disclosed in Fig. 2 is very similar to the control system illustrated in Fig. 1, corresponding reference characters have been used in Fig. 2 to those used in Fig. 1. In Fig. 2, however, it should be noted that the current collectors 1 and 3 are connected together by means of a resistor R3.

Considering the system illustrated in Fig. 1 to be in the condition shown and the motors M1 and M2 to be operated by the momentum of the vehicle carrying them, the operation of the system is as follows: a circuit for supplying energy to the rail conductor $r$ is completed from the ground conductor $g$ through the resistor R2, armature A2, and the current collector 1 to the supply circuit $r$, and a second circuit for supplying energy to the supply conductor $r$ is completed from the ground conductor $g$ through the resistor R1, armature A1, and the current collector 1 to the supply conductor $r$. The field windings F1 and F2 are excited by the generator armature GA through circuits including the resistors R1 and R2. The motor of the motor-generator set 2 is operated by a circuit which may be traced from the ground conductor $g$, through the field winding GF, field winding MF, armature MA, and the current collector 3, to the supply conductor $r$. Thus it is noted that the propelling motors M1 and M2 are operated to supply energy to the supply conductors $g$ and $r$ and the motor-generator set 2 is operated to furnish energy for exciting the field windings F1 and F2 of the motors M1 and M2.

The resistors R1 and R2, which are in the circuit of the field windings F1 and F2 and in the circuit of the armatures A1 and A2, serve to regulate within certain limits the currents which are generated by the propelling motors M1 and M2. In case an increased current flows through the armatures A1 and A2 and through the corresponding resistors R1 and R2, then the voltage drop across the resistors will be increased so as to offer an increased resistance to the current flowing through the field winding F1 and F2 and thus reduce the excitation of the motors M1 and M2. In case the current flowing through the armatures A1 and A2 and the resistors R1 and R2 be lowered, then the voltage drop across the resistors R1 and R2 is lowered so that the current flowing through the field windings F1 and F2 is increased to increase the excitation of the motors M1 and M2.

Assuming that the motor-generator set 2 and the armatures A1 and A2 are connected to one current collector, as for example current collector 1 as is the present custom, then an excessive voltage is generated in a local circuit including the armatures A1 and A2 whenever the current collector 1 is disconnected from the supply conductor $r$. Considering the current collectors 1 and 3 joined together and disconnected from the supply conductor $r$, a local circuit is formed from the ground $g$, through the resistor R2, armature A2, armature MA, field winding MF and field winding GF to the ground conductor $g$, and a second local circuit is formed from the ground conductor $g$, through the resistor R1, armature A1, armature MA, field winding MF and field winding GF to the ground conductor $g$. The armatures A1 and A2 thus control the excitation of the field windings F1 and F2 of the motors M1 and M2, and if the current collectors 1 and 3, which are assumed to be connected together, are disconnected from the supply conductor $r$ a sufficient length of time, then an excessive voltage will be generated in the local circuits including the armatures A1, A2 and MA.

However, when the motor-generator set 2 is connected to the supply conductor $r$ by a current collector 3 separate from the one serving to connect the motors M1 and M2 to the supply conductor, it is impossible to have any local circuit formed through the armatures A1 and A2 and the armature MA. Thus, with the motor-generator set 2 separated from the armatures A1 and A2, it is impossible for the motors M1 and M2 to develop a current of an excessive voltage when either one or both of the current collectors 1 and 3 are disconnected from the supply conductor $r$.

In Fig. 1 the two current collectors 1 and 3 are preferably mounted on the same truck of the vehicle and are fairly close together, whereas the current collectors 1 and 3 in Fig. 2 are preferably mounted on separate trucks of the vehicle and are somewhat separated from each other. In the system disclosed in Fig. 2, similar regenerative circuits are formed through the armatures A1 and A2 to those described in connection with Fig. 1 and similar exciting circuits are formed through the field windings F1 and F2 to those disclosed in connection with Fig. 1. In Fig. 2 the current collectors 1 and 3 are connected by a resistor R3, but this resistor is constructed of a sufficient strength to prevent a current of an excessive voltage flowing through the local circuits including the armatures A1 and A2 and the armature MA.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control for an electric vehicle, the combination with a supply circuit, a plurality of motors having armatures and field windings, and an auxiliary dynamo-electric machine, of separate switches for connecting said motors and said machine to the supply circuit for preventing the motors supplying power to the dynamo-electric machine when the motors are disconnected from the supply circuit and are operated as generators.

2. In a system of control, the combination with a supply circuit, a plurality of motors having armatures and field windings and adapted to be operated as motors and as generators, and a motor-generator set for energizing the field windings of said motors, of separate switches for connecting said motors and said motor-generator set to the supply circuit for preventing the motors supplying power to the motor-generator set when the motors are disconnected from the supply circuit and are operated as generators.

3. In a system of control, the combination with a supply circuit, a plurality of motors having armatures and field windings, and a motor-generator set, the generator of said motor-generator set being connected in circuit with the field windings of said motors, of separate switches for connecting the motor of said motor-generator set and the motors to the supply circuit for preventing the armatures of said motors from generating an excessive current in circuit with the motor armature of said motor-generator set when the motors are disconnected from the supply circuit and are operated as generators.

4. In a system of control, the combination with a supply circuit and a plurality of dynamo-electric machines connected across the supply circuit and having armatures and field windings, said machines being adapted to be operated as motors or as generators, of a motor-generator set for energizing the field windings of said machines, and a separate switch for connecting said motor-generator set across the supply circuit for preventing the over exciting of the machine field windings when said machines are disconnected from the supply circuit and are operated as generators.

5. In a system of control, the combination with a supply circuit, and a plurality of motors connected across the supply circuit and having armatures and field windings, of means for exciting said field windings, the exciting means having a separate detachable connection across said supply circuit.

6. In a system of control, the combination with a supply circuit, and a plurality of motors connected across the supply circuit and having armatures and field windings, of a motor-generator set for exciting the field windings of said motors, said motor-generator set having a separate detachable connection across the supply circuit for preventing an excessive excitation of the motors when the latter are disconnected from the supply circuit and are operated as generators.

7. In a system of control for an electric vehicle, the combination with a supply circuit and a plurality of dynamo-electric machines having armatures and field windings and adapted to be operated as motors and as generators, of means comprising an auxiliary dynamo-electric machine for separately exciting the field windings of said motors, and means comprising a high-resistance circuit for interconnecting the machines to prevent the forming of a local circuit including the auxiliary dynamo-electric machine and the armatures of the first-mentioned dynamo-electric machines when the latter are disconnected from the supply circuit and are operated as generators.

8. In a system of control for an electric vehicle, the combination with a plurality of motors having armatures and field windings, and a motor-generator set, the generator armature of said set being connected in circuit with the motor field windings, of means for connecting the motor armature and the field windings of the motor-generator set across the supply circuit, and detachable means for separately connecting the armature of said motors across the supply circuit.

9. In a system of control for an electric vehicle, the combination with a plurality of motors having armatures and field windings and adapted to be operated as motors and as generators, and a motor-generator set for exciting the field windings of said motors, of means for connecting the armatures of said motors across the supply circuit and separate detachable means for connecting the motor of the motor-generator set across the supply circuit.

10. In a system of control for an electric vehicle, the combination with a supply circuit and a motor having an armature and a field winding and adapted to be operated as a motor and as a generator, of means comprising a dynamo-electric machine for separately exciting the field winding of said motor, and means comprising a translating device for interconnecting the motor and the machine to prevent the forming of a local circuit including the dynamo-electric machine and the armature of the motor when the latter is disconnected from the supply circuit and is operated as a generator.

11. In a system of control, the combination with a supply circuit, a plurality of dynamo-electric machines adapted to be connected to said supply circuit, said machines having armatures and field windings and being adapted to operate as motors or as generators, and a current-collecting device adapted to connect said machines to said supply circuit, of a motor-generator set for energizing said field windings, and a separate current-collecting device for connecting said motor-generator set to said supply circuit and adapted to prevent the over excitation of the field windings of said machines when the same are operating as generators.

12. In a system of control, the combination with a line circuit, a plurality of dynamo-electric machines having armatures and field windings connected across the line circuit and adapted to operate as motors and as generators, of means for exciting said field windings, and a separate detachable connection across the line circuit for said exciting means whereby a local circuit through the exciting means is prevented in case said dynamo-electric machines are disconnected from the line circuit when serving as generators.

13. In a system of control, the combination with a line circuit, a plurality of motors connected across the line circuit and having armatures and field windings, of dynamo-electric means for separately exciting said field windings, and a separate detachable connection for said dynamo-electric means across the line circuit, whereby a local circuit through the exciting means is prevented in case said motors are disconnected from the line circuit when operating as generators.

In testimony whereof I have hereunto subscribed my name this 10th day of Oct., 1916.

RALPH E. FERRIS.

Copies of this patent may be obtained for five cents each, by addressing the "Commissioner of Patents, Washington, D. C."